United States Patent
Dove et al.

(10) Patent No.: US 6,741,973 B1
(45) Date of Patent: May 25, 2004

(54) CONSUMER MODEL

(75) Inventors: Lee G. Dove, Coupar Angus (GB); Graham I. Johnson, Tayport (GB)

(73) Assignee: NCR Corporation, Dayton, OH (US)

( * ) Notice: Subject to any disclaimer, the term of this patent is extended or adjusted under 35 U.S.C. 154(b) by 1077 days.

(21) Appl. No.: 08/950,230

(22) Filed: Oct. 14, 1997

(30) Foreign Application Priority Data

Apr. 4, 1997 (GB) ............................................. 9706816

(51) Int. Cl.$^7$ .......................... G06F 15/18; G06F 17/00
(52) U.S. Cl. ......................................... 706/13; 706/47
(58) Field of Search ..................... 706/13, 47

(56) References Cited

U.S. PATENT DOCUMENTS

| | | | |
|---|---|---|---|
| 5,343,554 A | * 8/1994 | Koza et al. ................... | 706/13 |
| 5,708,774 A | * 1/1998 | Boden ......................... | 706/13 |
| 5,940,816 A | * 8/1999 | Fuhrer et al. ................. | 706/13 |

OTHER PUBLICATIONS

N. R. Jennings, "Using Intelligent Agents to Manage Business Process", IEE Colloquium on Intelligent Agents and Their Application, Apr. 1996.*

Han et al, "MultiAgent Problem Solving with Mental States", IEEE Proceedings of the 1994 Second Australian and New Zealand Conf. on Intelligent Inforation System, Nov.–Dec. 1994.*

Mikami et al, "Combining Reinforcement Learning with GA to find Co–Ordinated Control Rules for Multi–Agent System", Preceedings of IEEE Inter. Conf. on Evolutionary Computation, May 1996.*

Bimbo et al, "Specification by–Example of Virtual Agents Behavior", IEEE Transactions on Visualization and Computer Graphics, vol. 1, No. 4, Dec. 1995.*

Thimbleby et al, "Concept of Cooperation in Artificial Life" IEEE Transactions on System, Man and Cybernetics, Jul. 1995.*

Heudin et al, "Artificial Life and Evolutionary Computing in Machine Perception", IEEE Proceedings of Computer Architectures for Machine Perception, Sep. 1995.*

Wildberger, A. Martin, "Introduction & Overview of "Artificial Life" Evolving Intelligent Agents for Modeling and Simulation", IEEE Proceedings of the 1996 Winter Simulation Conf., 1996.*

Fulkerson et al, "The Living Factory: Application of Artificial Life to Manufacturing", IEEE Proceedings of the Second International Symposium on Autonomous Decentralized Systems, Apr. 1995.*

Dave Cliff, "Where Creatures Came From: A review of research literature relevant to CyberLife™ technology, prepared for NCR Financial Systems Ltd.", School of Cognitive and Computing Sciences, University of Sussex, Brighton BN1 9QH, U.K., Apr. 1997, pp 1–46 (including Bibliography).

* cited by examiner

Primary Examiner—George B. Davis
(74) Attorney, Agent, or Firm—Gregory A. Welte

(57) ABSTRACT

A model of consumer behavior in a transaction environment such as customers moving around a bank branch, is generated from an artificial life algorithm to create a number of agents. In each agent, a genetically encoded drive, equivalent for example to hunger, is defined so as to correspond to a transaction need such as the need for cash. Interaction rules, such as navigation rules, are set for interaction between the agents and a first representation of an environment, and the program is run and the agents observed, then compared with real human behavior. The best matched agents are selected and the program run again, the steps being repeated until a required level of comparison with real behavior is reached. The model can then be used with different transaction environments to study customer behavior and to select the best branch layout or the like.

11 Claims, 1 Drawing Sheet

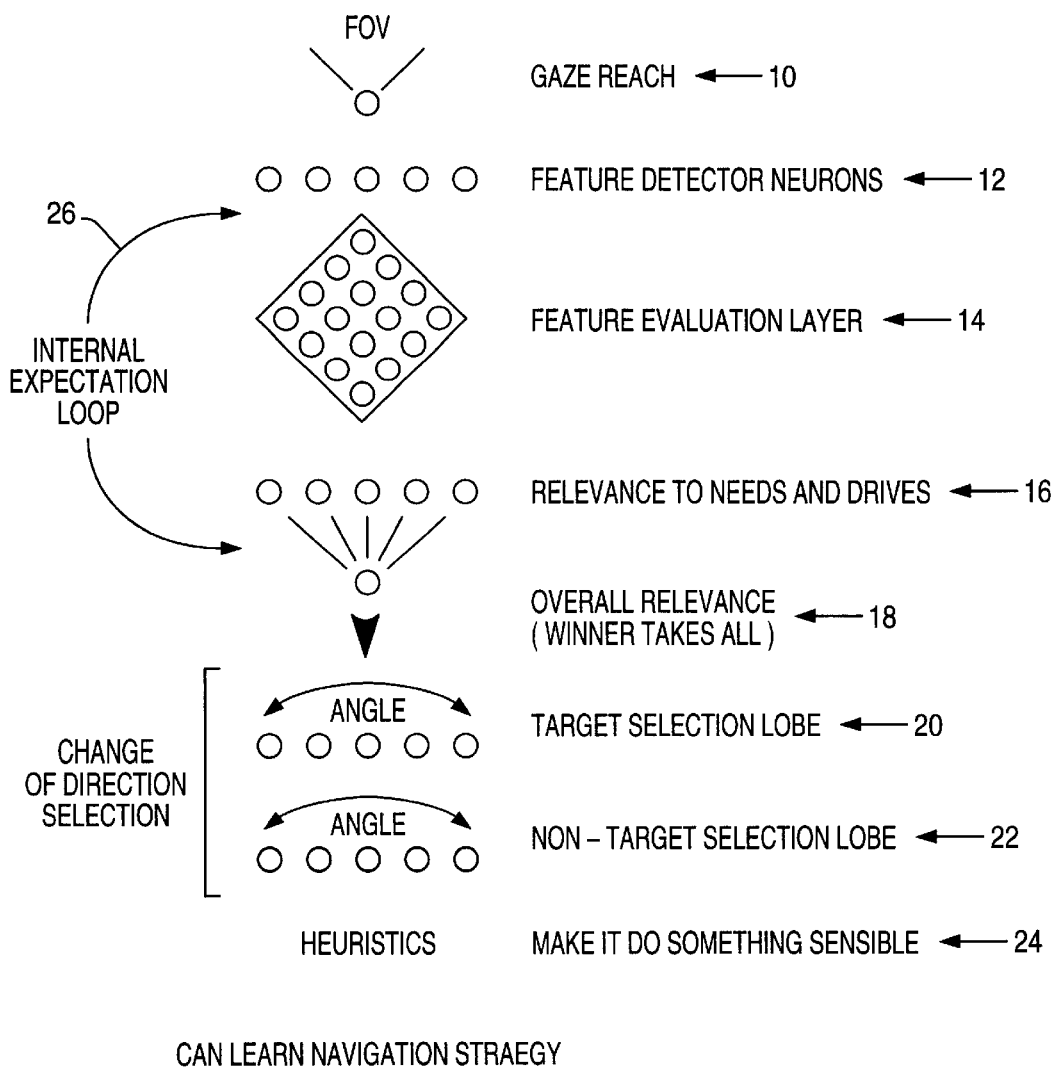

CONSUMER MODEL

BACKGROUND OF THE INVENTION

This invention relates to a method of generating a simulation model of consumers in a transaction environment, such as the behavior of customers in a bank branch.

Conventionally, a computer-based model of the behavior of consumers in a transaction environment is built by an expert using a combination of education (incorporating at least part of the previous model) and experience (altering a previous model or creating a new model). The expert selects and programs-in the characteristics of consumer behavior.

As transaction business, especially financial transaction business, becomes more complex, such models must also become more complex, and therefore difficult and time consuming to create. Even a model of queuing behavior, which is merely one factor in a transaction business, is complex to generate.

SUMMARY OF THE INVENTION

It is the object of the invention to provide an improved method of creating a model of consumer behavior in a complex environment.

According to the invention a method of generating a model of customer behavior in a transaction environment, characterized by the steps of:

selecting a software development tool incorporating at least one artificial life algorithm and capable of constructing a plurality of agents each having at least one drive;

defining at least one drive for each agent which is to be matched to a transaction-related need; and genetically encoding the defined drives.

Artificial Life or "Alife" was defined by Langton in 1992 as published on http://lslwww.epfl.ch/~moshes/alife.html- "a field of study devoted to understanding life by attempting to abstract the fundamental dynamical principles underlying biological phenomena, and recreating these dynamics in other physical media—such as computers—making them accessible to new kinds of experiment manipulation and testing.

In addition to providing new ways to study the biological phenomena associated with life here on Earth, life-as-we-know-it, Artificial Life allows us to extend our studies to the larger domain of "bio-logic" of possible life, "life-as-it-could-be . . . "

The drives in Alife systems include hunger, the need to sleep, and the wish to reproduce etc.; within the models, a drive reduction leads to a positive reinforcement in an agent.

In the method according to the invention, at least one such drive is specified and genetically encoded to equate to a consumer need in a transaction environment. Examples include the need for cash, or the need to make a deposit, in a financial transaction environment. Applications in retail or other interactive environments are also possible.

In the method according to the invention, a number of agents are created, each having a plurality of drives and sensors; interfaces are defined between the agents and a representation of a physical environment which is sensed by the sensors, and in which the agents make transactions; for example navigation rules are made which prevent any agent from moving through a wall.

In this specification "agents" means computational systems which inhabit dynamic unpredictable environments.

Also according to the invention, a number of agents is created, for example eight or more, but usually several hundred; the model is run, and, as is known in Alife modelling, a fitness function is applied by which a percentage of the agents is selected which best correspond to observed behavior in real life. In the invention, the agents are selected which best match the observed behavior of humans, for example in a bank branch.

As the model is run, the agents may reproduce or randomly mutate or may remain unchanged; the application of the fitness function may be applied several times until a required number of agents is available which all match actual customer behavior to within predetermined limits.

It is an advantage of a model according to the invention that a full model of each human customer is not required; only the inputs which affect the behavior of a human in a financial transaction, or other selected, environment are required as inputs.

After creation, the model can be constantly updated by comparison with newly derived information about real human customers.

After creation, the model can be used to predict behavior in different environments, such as different bank branch layouts.

BRIEF DESCRIPTION OF THE DRAWINGS

The invention will now be described by way of example only in greater detail, including by reference to FIG. 1 which illustrates an architecture of "brain" for an agent in a model according to the invention.

DETAILED DESCRIPTION

One suitable basis for a model according to the invention is for example the software development tool supplied by the company CyberLife Limited under the name Gaia.

In the first step of providing a model of customer behavior in a bank branch, in each agent created by the software tool, at least one genetically encoded drive is programmed as a specified attribute or characteristic to correspond to one of the consumer drives listed in table 1.

TABLE 1

Need for cash
Need for balance information
Need for mortgage
Need for loan
Need to make deposit
Need for statement
Need for satisfaction
Social needs (interactions)

Reduction of a drive gives positive reinforcement to that agent, as with the biological equivalent; for example if need for cash is made equivalent to hunger, then getting cash is equivalent to eating and provides positive reinforcement of action as a desirable drive reducer.

Initially the model is constructed to have a few hundred agents. As is known in Alife algorithms, each agent is also provided with at least one sensor and in this application each sensor is programmed to sense a physical object representation or object attribute relating to a bank branch. These physical attributes are listed in table 2, which also lists the attributes of each object.

TABLE 2

| Physical Object | Object Attributes |
| --- | --- |
| ATMs | Color size (height, width, depth,) |
| Table | |
| Pot Plant | Machine |
| Person | Texture |
| Tellerstation | Speed/direction |
| Noticeboard | Sound |
| Sign | |
| Television | |
| Paper | |
| Chair | |
| Personal computer | |
| Walls | |
| Door | |
| Partition | |
| Writing area | |
| Queue system | |

It will be seen that physical objects include objects with which an agent must not physically overlap, such as a wall; objects with which an agent may need to interact, such as ATM; and objects to which special rules apply, for example a queue—the agent must join the end of the queue.

The physical objects are arranged to correspond to a real-life bank branch in which real customer movements have been recorded by some method which will be described later.

The model constructed from the software tool is then run for a period during which the initially-programmed agents (the first population) interact with the physical objects; some agents may mutate or reproduce or both and after a period a second population will be available. As is conventional in use of Alife algorithms, a fitness function is then applied. The behavior of the second population is tested against the observed behavior of humans in a bank branch, on a one-to-one basis, i.e. one agent to one observed human.

Such human behavior may be observed by video cameras in a real bank branch, and their movements between tellers, ATMs, notice boards etc. may be tracked as a vector of coordinates for each human. Such vectors can then be compared with vectors of coordinates corresponding to each agent in the model.

In an alternative method, Markov models are generated on real data and the simulated data, as is conventional in animal behavior studies, in which movements and actions are broken down into a fixed number of categories; the real and simulated examples are then compared.

After application of the fitness function, the 50% of the agents providing the best fit are selected—this 50% may include both original agents and mutants or offspring, and the remaining 50% are culled.

The steps of running the model and applying the fitness function are applied several times, until a population of agents is available which matches actual human behavior in the real bank branch to within predetermined limits; the number of agents should be sufficient to provide a good overall model of customer behavior.

This final population of agents now forms a simulation model which may be used to test the effect of changes in branch layout by changing the physical attributes, for example providing more ATMs, fewer human tellers, a different layout, new advertising materials etc. The model may be run in coordination with several different layouts and the best layout selected, for example one which provides minimum waiting time, greatest customer satisfaction etc. depending on the objective. Factors which can be evaluated are set out in table 3.

TABLE 3

Customer movement within the branch: where customers go, in what order they visit different physical attributes
Queuing: how queues form, queue length
Branch throughput measures such as Number of Bodies, Number of Transactions, Transaction Value
Branch evolution: the simulation model will allow different branch layouts to be evaluated
Customer satisfaction: as a customer moves through the branch, measures are take of how the task are performed and used to indicate level of satisfaction; for example if there are no queues and the task is completed quickly there will be high consumer satisfaction; taking all consumers together will give an overall measure of how a branch performs for its customers.
Information Transfer from Advertising: the position within the branch of advertising boards can be selected depending on how many customers stop at a board and for how long (e.g. long enough to read it).

One important factor of an agent in a model according to the invention is the sensor which allows the agent to sense and interact with the "physical" environment. One possible sensing arrangement is illustrated in FIG. 1 and will be referred to as the "brain" of an agent.

The brain operates at several levels; a first level 10 is the external sensing level, at which a field of view FOV is defined. A second level 12 is provided with a number, in this case five, of feature detector neurons, and the features detected by level 12 are evaluated in a feature evaluation level 14. After evaluation, the relevance of the feature to the needs and drives of the agent is evaluated in level 16, and overall relevance or greatest relevance determined in level 18 on a "winner takes all" basis.

The feature determined as having greatest relevance is naturally within the field of view at level 10, but the agent must navigate so as to approach that feature; the brain has as level 20 a number of target selection lobes, spanning a substantial angle of possible directions of movement of the agent; similarly in level 22 a number of non-target selection lobes, spanning a similar angle, are provided to allow the agent to navigate around obstacles (?). Levels 20 and 22 together allow the selection of a change of direction of movement of the entity, for example towards its selected feature.

Level 24 is a heuristics layer, ensuring that the agents function in a sensible manner.

Between the relevance evaluation layer 16 and the feature detection neuron layer 12 there is an internal expectation loop 26 which acts to provide feedback.

Such a brain can be arranged to recognize the physical attributes listed in table 2, optionally in the form of a grammar an example of which is set out in table 4 below.

TABLE 4

Bank → door walls$^{3+}$ staff$^+$ customers* fittings
fittings → furniture* servicepoint*
servicepoint → teller window | ATM
ATM → cash only | deposit | information | all
staff → teller | greeter | security | manager where
*is 0 or more
+is 1 or more
| is 'or' i.e., teller window or ATM In addition to the essentially financial drives referred to above, each agent may in addition be provided with a drive corresponding to the need for human interaction (the agent prefers a human teller to an ATM) or to the need to maximize the satisfaction with services provided.

As with all Alife models, several drives may need to be satisfied concurrently.

In addition to modelling a bank branch layout, a model according to the invention may be applied to other financial transaction environments, such as a loan agent environment, and other delivery channels can be modeled, for example telephone banking, internet banking etc. in which factors in the model would include channel availability, service time etc.

Parallels will easily be drawn in services other than financial transactions, such as retail transactions.

What is claimed is:

1. A method of generating a model of customer behavior in a transaction environment, comprising by the steps of:
    (a) selecting a software development tool incorporating at least one artificial life algorithm and capable of constructing a plurality of agents each having at least one drive;
    (b) defining at least one drive for each agent which is matched to a transaction-related need; and
    (c) genetically encoding the defined drives.

2. A method according to claim 1, further comprising the steps of:
    (d) generating a representation of a transaction environment; and
    (e) generating a plurality of agents each having a drive corresponding to a transaction-related need and each capable of interacting with the environment in accordance with predetermined rules.

3. A method according to claim 2, further comprising the steps of:
    (f) causing the agents to interact with the representation of a transaction environment;
    (g) recording the interactions;
    (h) comparing the interactions of each agent with the representation of the environment against real life interaction of humans with the transaction environment; and
    (i) selecting a number of agents which provide the best comparison.

4. A method according to claim 3, steps (f), (h), and (i) are repeated until a required number of agents conform to a predetermined level of comparison.

5. A method of predicting and exploring potential patterns of customer behavior in a transaction environment, the method comprising the steps of:
    (a) generating a customer behavior model which includes a plurality of agents each having a drive corresponding to a transaction-related need and each capable of interacting with the environment in accordance with predetermined rules;
    (b) generating a representation of a different transaction environment;
    (c) causing selected agents to interact with the different representation; and
    (d) observing the interactions of step (c).

6. A method of modeling human behavior, comprising the following steps:
    a) creating a computer model of a financial institution;
    b) creating a group of agent-models which undergo interactions with
        i) each other and
        ii) the financial institution;
    c) monitoring the interactions of the agent-models;
    d) monitoring actual interactions of actual people with
        i) a financial institution; and
        ii) each other; and
    e) using the actual interactions to select agent-models from the group.

7. Method according to claim 6, and further comprising the step of
    f) running simulations using the selected agent-models, and not using non-selected agent-models.

8. A method of modeling customers in a financial environment, comprising the following steps:
    a) creating a number of model-agents,
        i) each equipped with at least one drive, and
        ii) some of the drives comprising a need for cash;
    b) creating a model of a financial environment;
    c) creating a set of interaction rules, which govern interactions
        i) among model-agents and
        ii) between model-agents and the environment;
    d) running the model, wherein the model-agents perform interactions
        i) among themselves and
        ii) with the environment;
    e) comparing the interactions of paragraph (d) with actual interactions
        i) among actual persons and
        ii) between actual persons and an actual financial environment; and
    f) selecting the model-agents whose model interactions most closely resemble the actual interactions.

9. Method according to claim 8, and further comprising the step of running a simulation in which the model-agents selected in paragraph (f) are used in a simulation involving a different financial environment.

10. A method of modeling customer behavior in a financial environment, comprising the following steps:
    a) running a first simulation, wherein a group of simulated people perform simulated behaviors, wherein they interact with each other and with a first financial environment;
    b) selecting simulated people from the group; and
    c) running a second simulation, wherein the selected simulated people of paragraph (b) perform simulated behaviors in a second financial environment.

11. Method according to claim 10, wherein the selection of paragraph (b) is based at least partly on comparison of behavior of the simulated behaviors with actual behavior of actual people.

* * * * *